United States Patent [19]
Kim et al.

[11] Patent Number: 5,621,471
[45] Date of Patent: Apr. 15, 1997

[54] SYSTEM AND METHOD FOR INSERTING AND RECOVERING AN ADD-ON DATA SIGNAL FOR TRANSMISSION WITH A VIDEO SIGNAL

[75] Inventors: William E. Kim, King County; Nathan P. Myhrvold, Bellevue; Gideon A. Yuval, Mercer Island, all of Wash.

[73] Assignee: Microsoft Corporation, Redmond, Wash.

[21] Appl. No.: 237,265

[22] Filed: May 3, 1994

[51] Int. Cl.$^6$ .................................................. H04N 7/081
[52] U.S. Cl. .......................................... 348/473; 348/486
[58] Field of Search .................................... 348/473, 486, 348/461, 21; 455/47, 48; H04N 7/08, 7/081

[56] References Cited

U.S. PATENT DOCUMENTS

| | | | |
|---|---|---|---|
| 3,084,329 | 4/1963 | Clay | 455/48 |
| 3,842,196 | 10/1974 | Loughlin | 348/486 |
| 3,924,060 | 12/1975 | Bedford | 348/486 |
| 4,660,072 | 4/1987 | Fukinuki | 358/12 |
| 4,686,705 | 8/1987 | Smith | 455/47 |
| 4,745,460 | 5/1988 | Fukinuki | 358/12 |

(List continued on next page.)

FOREIGN PATENT DOCUMENTS

WO92/22984  12/1992  WIPO ............................. H04N 7/08

OTHER PUBLICATIONS

C. Luebke, "New wave in data communications may start here," *The Business Journal*, Oct. 26, 1992.
"Now, Data Can Hitchhike On TV Signals," *Business Week*, Dec. 7, 1992.
"Mixed signals," *USA Today Money*, Jan. 13, 1993.
"New Transmission System Piggybacks Signals," *Interactive World*, Feb., 1993.
C. Jungo, "Transmitting hidden data in video signals," *Broadcast Engineering*, Feb., 1993.
"WavePhore Develops High Speed Data Modem for Television," *TV TechCheck*, Feb. 22, 1993.
"Modem Piggybacks TV Signal," *EDP Weekly* 34(13), Mar. 29, 1993.
"WavePhore Enables Broadcasters to Participate In 'Information Superhighway'," Press release from WavePhore, Inc., Apr. 19, 1993.
"Technology Offers TV Broadcasters An Avenue Into Interactive Services," *Investor's Business Daily* 10(6), Apr. 19, 1993.
"New System Delivers Interactive Video, Data Services Through Existing TV Signals," *CE Network News*, Apr., 1993.
J. Wynn, "The Technology Boom Beckons Investors," *Today's Investor* 13(5), May, 1993.

*Primary Examiner*—Victor R. Kostak
*Attorney, Agent, or Firm*—Seed and Berry LLP

[57] ABSTRACT

A system and method for modulating a data signal uses a phase shifting transformer function to phase shift the lower and upper sidebands of the data signal so that the sidebands of the data signal have a 180° phase shift with respect to each other (i.e., are complementary). The phase shifted sidebands are added to a standard video signal and then transmitted. A television or other video receiver demodulates the video signal with a simple demodulator circuit, which causes the upper and lower sidebands to be summed together. The data signal, with complementary sidebands, cancels out so that the data signal does not interfere with normal video operation. The upper and lower sidebands of the data signal are processed separately from the video processing circuitry of the television receiver. An inverse phase shifting circuit performs a second phase shift operation on the upper and lower sidebands of the data signal so that the data signal can be demodulated and the data signal recovered.

33 Claims, 8 Drawing Sheets

U.S. PATENT DOCUMENTS

| | | | |
|---|---|---|---|
| 4,821,101 | 4/1989 | Short | 358/181 |
| 4,839,743 | 6/1989 | Best et al. | 358/310 |
| 4,847,690 | 7/1989 | Perkins | 358/143 |
| 4,849,817 | 7/1989 | Short | 358/142 |
| 4,855,827 | 8/1989 | Best | 358/143 |
| 4,885,631 | 12/1989 | Fukinuki et al. | 358/21 R |
| 4,943,848 | 7/1990 | Fukinuki | 358/12 |
| 4,945,225 | 7/1990 | Gamgee et al. | 250/214 B |
| 4,945,402 | 7/1990 | Fukinuki | 358/12 |
| 4,955,872 | 9/1990 | Tomljenovic | 455/47 |
| 5,063,446 | 11/1991 | Gibson | 348/486 |
| 5,200,715 | 4/1993 | Gerdes et al. | 332/185 |
| 5,200,822 | 4/1993 | Branfin | 348/486 |

SYSTEM AND METHOD FOR INSERTING AND RECOVERING AN ADD-ON DATA SIGNAL FOR TRANSMISSION WITH A VIDEO SIGNAL

TECHNICAL FIELD

The present invention relates generally to video signal processing and more specifically to a system and method for inserting data into a standard video signal.

BACKGROUND OF THE INVENTION

The use of television is commonplace in the United States and throughout the world. Nearly every home in the United States has at least one television set. Many homes have cable television, which couples a large number of television channels to the home through a single coaxial cable. Other homes and businesses may have satellite receivers that are capable of receiving television signals from a number of satellites in stationary orbit around the earth.

Television signals are defined by the National Television Standards Committee (NTSC). Each television signal comprises a video signal and an audio signal. The NTSC signal, which evolved when only black and white (B/W) television was available, has a bandwidth of approximately 4.8 megahertz (MHz). The NTSC signal is modulated to a predetermined carrier frequency. For example, VHF channel 2 has a carrier frequency of 55.25 MHz. A small spacing in the frequency spectrum between adjacent channels prevents interference between channels. Other transmission systems, such as cable broadcasting, may use different frequencies for the television channels.

When color television was introduced, it was important that the color signals be added in a manner that did not interfere with the normal operation of B/W television signals. This was accomplished by introducing a chrominance signal modulated at a frequency that causes the chrominance signal for each line of the television signal to have an inverted phase with respect to the prior line. There are an odd number of lines in each television frame, with the result being that the chrominance signal for any given line is inverted in alternating frames of the television signal. The phase inversion causes the chrominance signal to cancel out temporally over the time of one frame, and spatially in the vertical axis over the space of two lines. The cancellation prevents the chrominance signal from erroneously being seen by the viewer as part of the luminance signal. This effect, combined with the known persistence of vision in humans causes the chrominance signal to effectively cancel out in a B/W television so that it causes no noticeable interference. The NTSC signal has a modulated chrominance signal that overlaps the luminance signal in a portion of the frequency spectrum where the overlap causes minimal interference.

The frequency spectrum of the NTSC signal is shown in FIG. 1A. As can be seen in FIG. 1A, the video signal comprises a luminance signal 2 and a chrominance signal 4. The luminance signal 2 provides the signal intensity for both B/W and color television signals. The luminance signal 2 has spectral peaks 6 every 15.75 kilohertz (kHz), which corresponds to the horizontal frequency in the television. The amplitude of the luminance spectral peaks 6 decreases up to 4.2 MHz. The video signal is suppressed above 4.2 MHz to permit the insertion of an audio signal 5 in the spectrum for the particular video channel. The audio signal 5 is modulated with a 4.5 MHz carrier.

The chrominance signal 4 is introduced beginning at about 2.1 MHz in the spectrum. The chrominance signal 4 has chrominance spectral peaks 8, which are also spaced 15.75 kHz apart in the frequency spectrum. The chrominance signal is modulated at a frequency of 3.579545 MHz (an odd multiple of half the line scan frequency) to cause the chrominance signal peaks to interlace with the luminance peaks, as shown in FIG. 1B, which illustrates a magnified portion of the spectrum of FIG. 1A.

As seen in FIG. 1B, the luminance spectral peaks 6 and the chrominance spectral peaks 8 are spaced apart by 7.875 kHz. Although FIG. 1B, shows the frequency spectrum with no overlap, there is some degree of overlap in these signals due to the non-periodicity of the signals with respect to the line scan frequency.

The selected carrier frequency and alternating phases cause the additional luminance signal to cancel out temporally and spatially in the same manner as the chrominance signal. The additional luminance signal ideally averages to zero, but in reality the signal averages to zero only if it is unchanging over time. Thus, the additional luminance signal will completely cancel only if it is unchanging. In signal processing terms, only common mode signals are completely canceled. Differential signals do not cancel each other out and will remain in the NTSC signal as a residual signal that may cause interference with the luminance signal. The amount of residual signal depends on the bandwidth of the additional luminance signal. The greater the bandwidth, the greater the amount of additional luminance signal that will feed through and become visible to the television viewer (in the form of interference).

Therefore, it can be appreciated that there is a significant need for a system and method for introducing an additional information signal into a video signal without the undesirable effects of signal interference or reducing bandwidth to avoid interference.

SUMMARY OF THE INVENTION

The present invention is embodied in a system comprising a signal generator generating a modulated signal having upper and lower sidebands, each sideband having a predetermined phase such that the phases are substantially 180° apart with respect to each other. An adder adds the modulated signal and a video signal to produce a modified video signal. A video receiver demodulates the modified video signal to recover the video signal, with the modulated signal canceling when demodulated by the video receiver. A signal processor receives the modified video signal and produces a recovered signal having upper and lower sidebands, each sideband having a predetermined phase such that the phases are substantially 0° apart with respect to each other. A demodulator demodulates the recovered signal such that the data signal may be inserted into a video signal, transmitted along with the video signal, and separated from the video signal.

In an alternative embodiment, a modulator modulates a predetermined carrier frequency with the data signal to produce a modulated signal having upper and lower sidebands. A signal processor processes at least one of the upper and lower sidebands such that the phase of the upper and lower sidebands are substantially 180° apart with respect to each other. An adder adds the upper and lower sidebands with the substantially 180° apart phase relationship to a video signal to produce a modified video signal. A video receiver demodulates the modified video signal to recover the video signal, with the upper and lower sidebands with the substantially 180° phase relationship canceling each other out when demodulated by the video receiver. An inverse signal processor receives the modified video signal and processes at least one of the upper and lower sidebands with the substantially 180° phase relationship so that the phase of the upper and lower sidebands are substantially 0° with respect to each other. A demodulator demodulates the upper and lower sidebands with the substantially 0° phase relationship to recover the data signal. A transmitter portion of the inventive system permits the insertion of a data signal into a video signal using a signal processor to transform the data signal into a processed signal having a first predetermined phase for negative frequencies and a second predetermined phase for positive frequencies, with the first and second phases being substantially 180° apart with respect to each other. A modulator modulates predetermined carrier frequency with the processed signal to produce a modulated signal and an adder adds the modulated signal in the video signal to produce a modified video signal containing the data signal and the video signal. In one embodiment, the signal processor may be a Hilbert transformer. The predetermined carrier frequency is 3.579545 MHz. Alternatively, the predetermined carrier frequency may be 1.25 MHz.

DETAILED DESCRIPTION OF THE INVENTION

The present invention describes a system and method for introducing an additional information signal into the NTSC signal without interfering with normal video signal processing. The additional information signal may be an analog data signal or a digital data signal. Whatever form the additional information signal may take, it will be referred to herein as a data signal.

The present invention inserts a data signal into an unused portion of the spectrum in a manner which does not require that the data signal be frame periodic. The data is filtered and modulated by a simple modulator so that the data signal can be directly inserted into the video signal. Furthermore, the principles of the present invention permit the insertion of the data signal into different portions of the NTSC standard video signal.

Figure 2A:
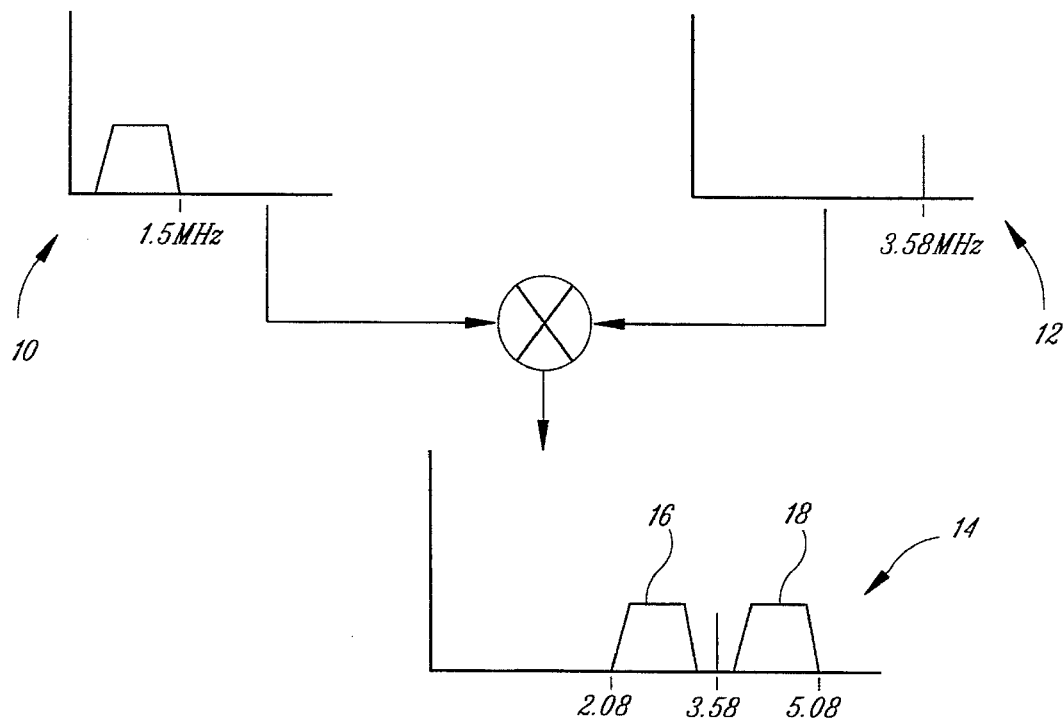
FIG. 2A illustrates the spectra of signals used in a modulation process for the chrominance signal in the prior art NTSC standard signal.
Figure 2B:
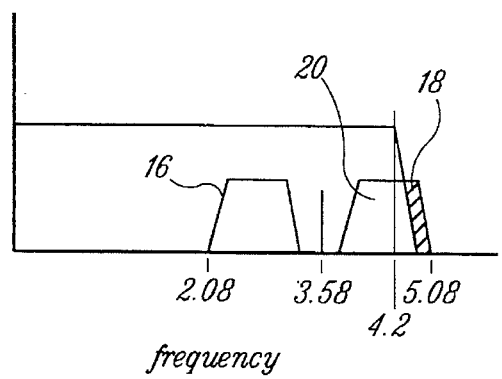
FIG. 2B illustrates the spectrum of the prior art NTSC standard signal after lowpass filtering the modulated chrominance signal of FIG. 2A.

The basic process of signal modulation is well known in the art. When any signal modulates a carrier frequency, there are upper and lower sidebands created by the modulation process. The upper and lower sidebands are mirror images of each other. In the NTSC standard video signal of the prior art, the chrominance signal has a bandwidth of approximately 1.5 MHz. The chrominance signal is modulated with a 3.579545 MHz chrominance carrier. For the sake of convenience, the frequency of the chrominance carrier will be rounded off to 3.58 MHz. It is understood that the 3.58 MHz signal refers to the chrominance carrier frequency. FIG. 2A shows a frequency spectrum 10 of the chrominance signal, a frequency spectrum 12 of the chrominance carrier, and a frequency spectrum 14 of the resulting modulated signal. A lower sideband 16 ranges from 2.08 MHz to 3.58 MHz, and an upper sideband 18 would normally range from 3.58 MHz to 5.08 MHz. However, to limit the amount of bandwidth used by the NTSC signal, the video portion is lowpass filtered starting at 4.2 MHz, shown in FIG. 2B, so that the upper sideband 18 is partially cut off, leaving a vestigial sideband 20 of approximately 900 kilohertz (kHz) from 3.58 MHz to 4.2 MHz. The audio carrier (not shown) is placed in the spectrum above the vestigial sideband 20. The vestigial sideband 20 is transmitted along with the lower sideband 16.

Figure 3A:
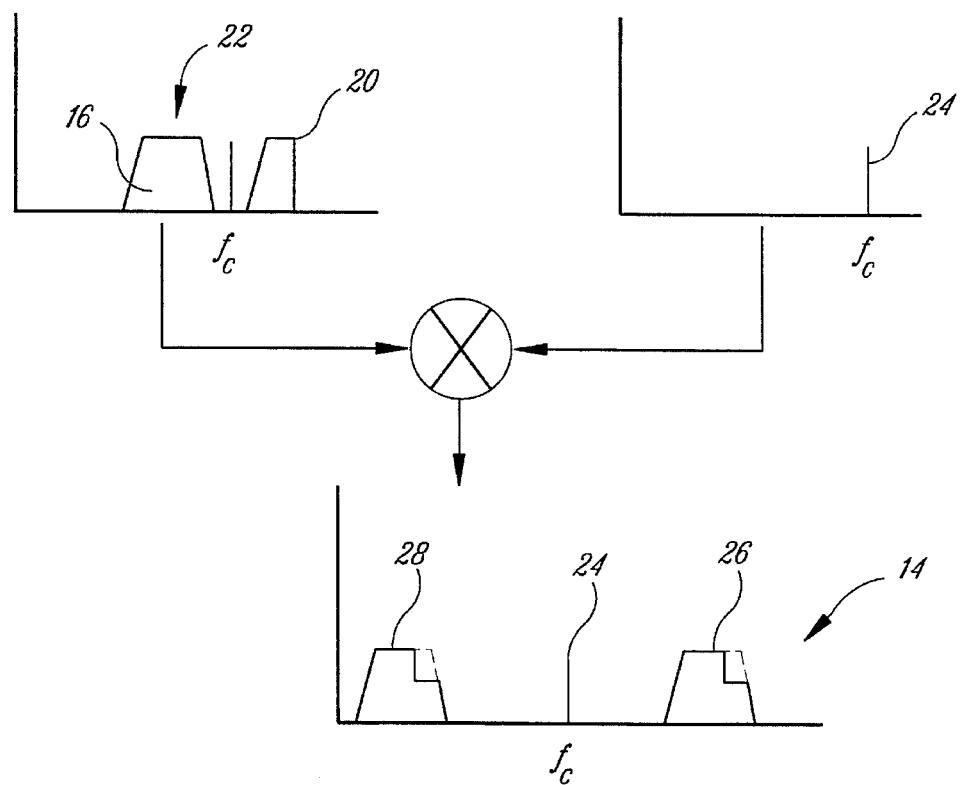
FIG. 3A illustrates the prior art system for the recovery of the chrominance signal by the use of an additional modulation process.

To demodulate the chrominance signal at the receiving end (e.g., using a television receiver), the chrominance signal 22 is modulated again with a 3.58 MHz carrier 24 generated within the receiver, as shown in the spectra of FIG. 3A. This produces an upper sideband 26 and a lower sideband 28. The lower sideband 28 is an image of the original upper and lower sidebands 16 and 18 starting at 0 Hz, and the upper sideband 26 is an image of the original upper and lower sidebands 16 and 18 centered at twice the carrier frequency. Note that the original upper and lower sidebands are summed together to produce a single band when modulated a second time.

Figure 3B:
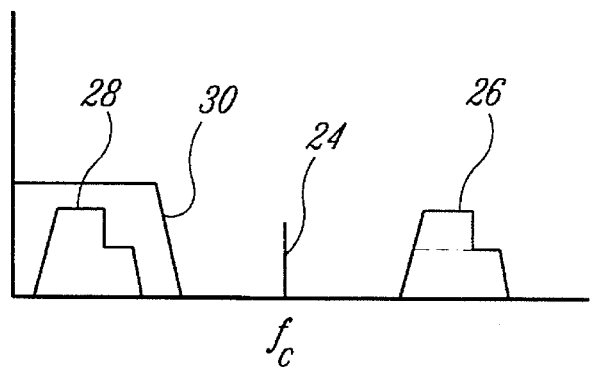
FIG. 3B illustrates the prior art uses of lowpass filtering of the recovered chrominance signal of FIG. 3A.
Figure 3C:
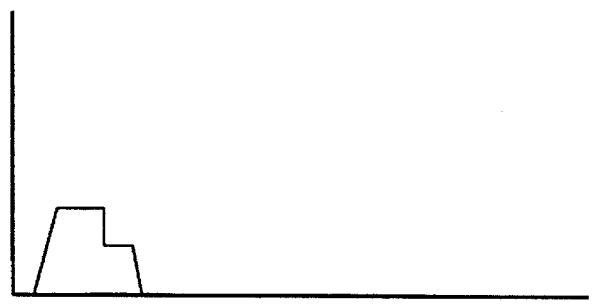
FIG. 3C illustrates the spectrum of the prior art chrominance signal after lowpass filtering

The upper sideband 26 and the 3.58 MHz carrier 24 are eliminated with a lowpass filter having a frequency response curve 30, as shown in FIG. 3B. Because the original upper sideband was previously lowpass filtered, the remaining signal, shown in FIG. 3C, shows the effect of the lowpass filtering. Thus, systems of the prior art transmit both the lower sideband 16 (see FIG. 2B) and the vestigial sideband 20 in the NTSC signal.

As is well known in the art, all of the information from the data signal is contained in each of the sidebands. The two sidebands are redundant and are not necessary for the complete recovery of the original data signal. Single sideband transmission is a well known form of radio communication today. This allows one of the modulated sidebands to be suppressed so that the transmitter energy can be concentrated into the remaining sideband. However, at the time television transmission technology was developing, the technology did not exist for single sideband transmission. Thus, even though it meant that redundant information was transmitted, both sidebands (the lower sideband 16 and the vestigial sideband 20) were included in the NTSC signal. To minimize the bandwidth needed by the upper and lower sidebands, the NTSC committee permitted the partial filtering of the upper sideband, as previously discussed. Even though modern technology would permit the use of single sideband transmission, the NTSC standard includes the vestigial upper sideband. Thus, from a technical perspective, the region of the NTSC signal from 3.58 MHz to 4.2 MHz is essentially free bandwidth, except for the portion of the spectrum occupied by the luminance signal. This is true even though there is a signal present in that portion of the spectrum.

The present invention exploits the fact that virtually all NTSC video equipment demodulates the chrominance signal in the manner described above so that the demodulated is the sum of the upper and lower sidebands present in the NTSC signal. The present invention alters the data signal in a manner that permits the data signal in the upper and lower sidebands to cancel out when demodulated by the normal video processing circuitry of the receiver. The present invention does not require a frame periodic data signal, nor does it require buffering to demodulate the data signal.

Figure 4A:
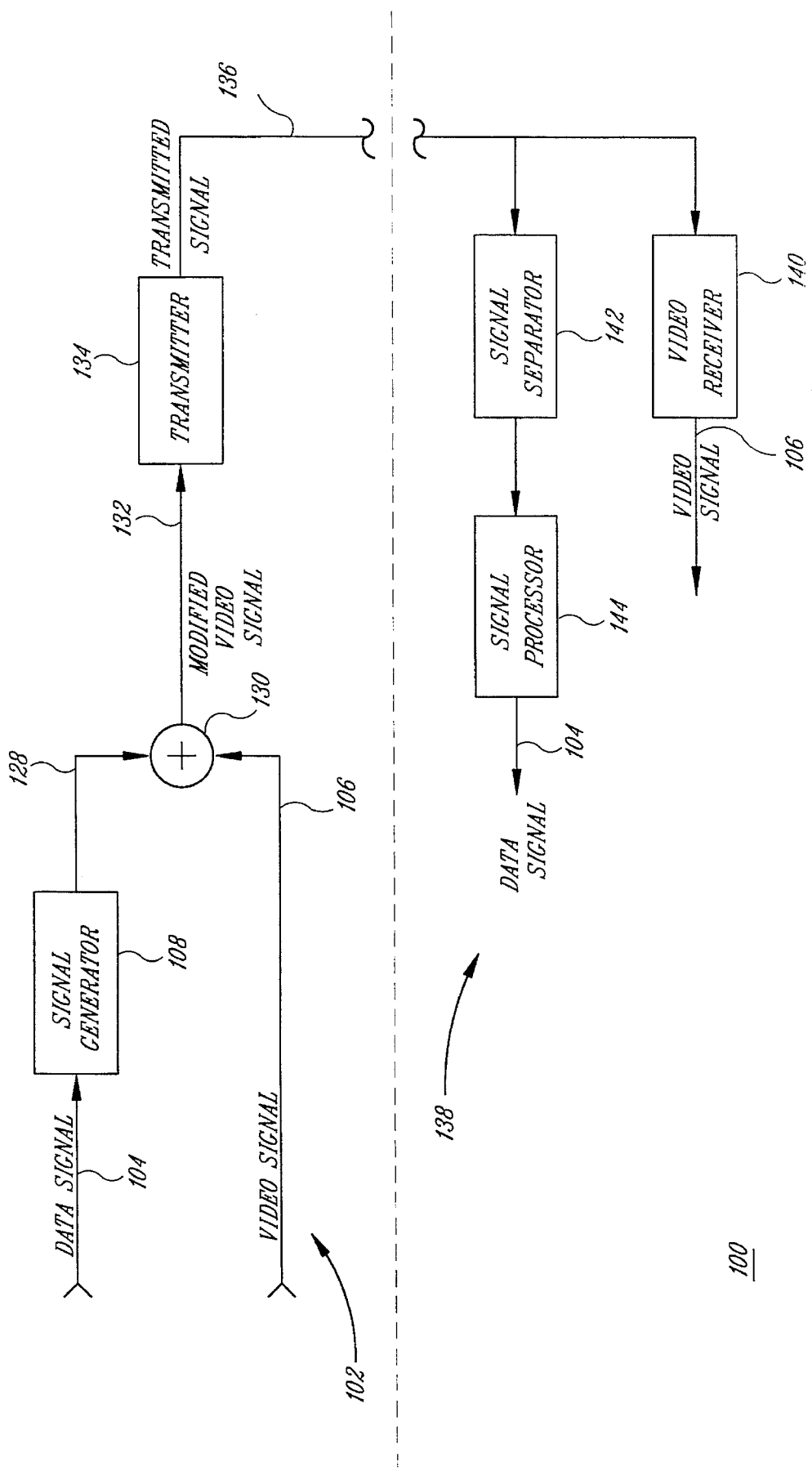
FIG. 4A is a functional block diagram of the system of the present invention.

The present invention is embodied in a system 100 shown in functional block diagram form in FIG. 4A. In a transmitter portion 102 of the system 100, a data signal 104 is inserted into an unused portion of the spectrum of a standard video signal 106. A signal generator 108 transforms the data signal 104 into a signal with dual complementary sidebands (DCSS) having opposite phases (i.e., with a 180° phase relationship). The DCSS signal has the property that the upper and lower sidebands are not merely symmetrical mirror images of each other, as is the case with a typical modulated signal having dual sidebands. Rather, the dual sidebands in the system 100 are antisymmetrical complementary images of each other. It is this antisymmetrical complementary property that permits the cancellation of the additional signal by the normal video processing circuitry of the receiver. There are a variety of techniques that can be used to generate the DCSS sidebands.

Figure 4B:
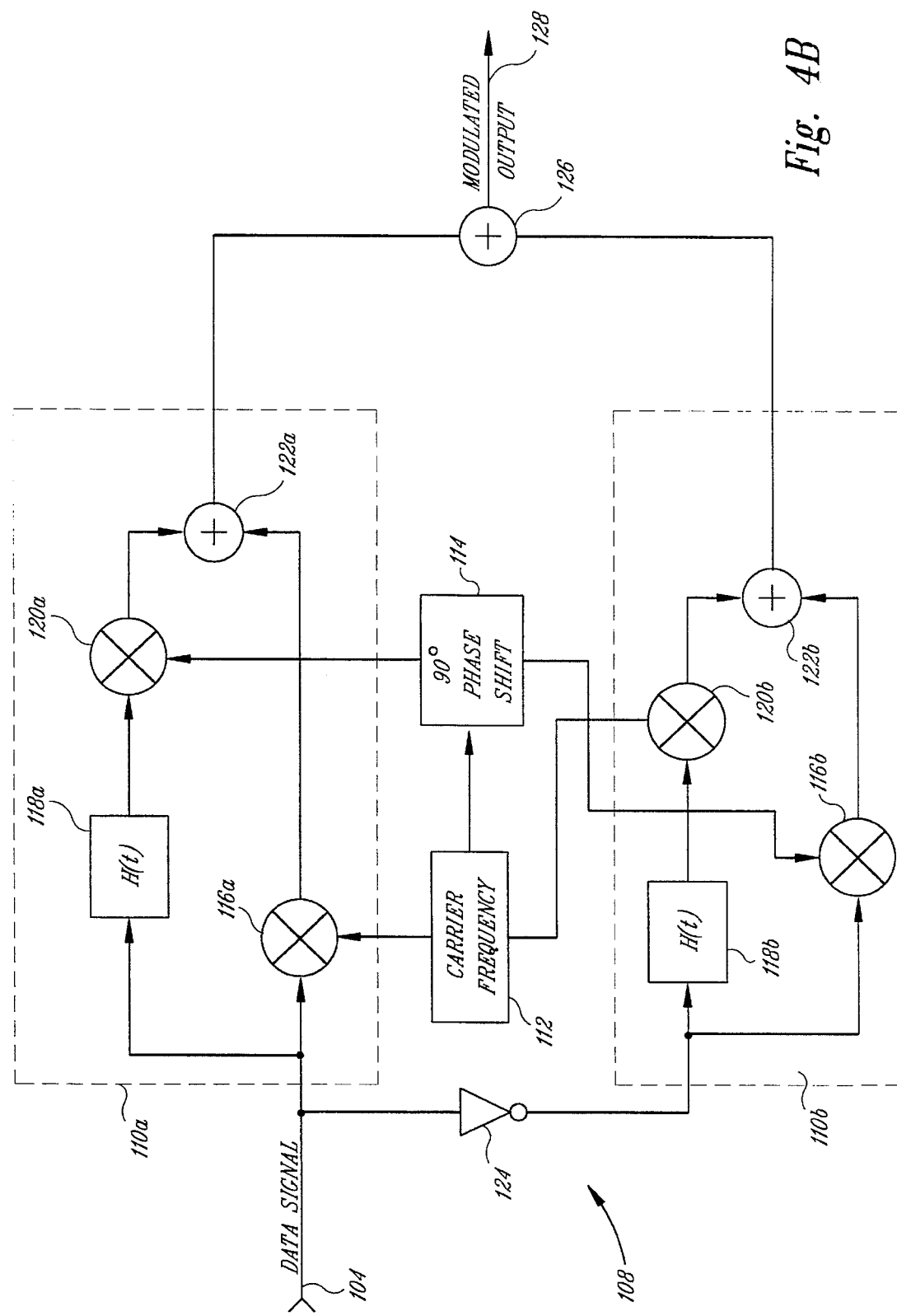
FIG. 4B illustrates one embodiment of the signal generator of FIG. 4A.
Figure 5:
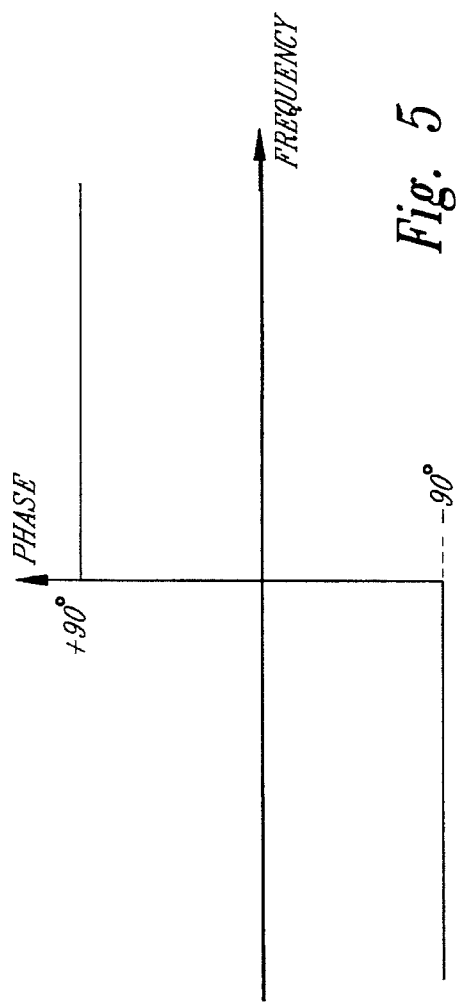
FIG. 5 illustrates the phase versus frequency curve of the differential filter of the system of FIG. 4B.

One such technique is shown in FIG. 4B, where two single sideband (SSB) generators 110a and 110b generate the two DCSS sidebands. The two SSB generators 110a and 110b are each modulated by a carrier frequency 112 and a quadrature counterpart of the carrier frequency generated by a 90° phase shift circuit 114. The SSB generator 110a receives and processes the data signal 104 in two separate signal paths. In the first signal path, the data signal 104 is modulated with the carrier frequency 112 by a modulator 116a. In the second signal path, the data signal is first modified by a differential filter 118a, also known as a Hilbert transformer. The differential filter 118a shifts all frequency components of the data signal 104 by 90°. A phase versus frequency diagram of the differential filter 118a is shown in FIG. 5. The phase response of the differential filter 118a resembles a step function, but transforms the phase of all negative frequencies by +90° and transforms the phase of all positive frequencies by −90°. As is well known in the art, the data signal 104 has a mathematical counterpart with negative frequency and inverse phase with respect to the data signal. For example, a 1000 Hz signal with 0° phase has a mathematical counterpart of −1000 Hz and −180° phase. The differential filter 118a is a well-known circuit element commonly used in single sideband (SSB) radio circuits. The differential filter 118a can be constructed with a 90° phase delay. The −90° phase shift of the data signal 104 causes a +90° phase shift of the mathematical counterpart of the data signal.

The output of the differential filter 118a is modulated with the carrier signal from the 90° phase shift circuit 114 by a second modulator 120a in the SSB generator 110a. The outputs from the modulator 116a and the modulator 120a are summed together by an adder 122a to produce a single sideband.

The data signal 104 is inverted by an inverter 124 before being coupled to the input of the SSB generator 110b. The inverter 124, in conjunction with the SSB generators 110a and 110b, generate upper and lower sidebands with complementary phase relationship. The operation of the SSB generator 110b is identical to that of the SSB generator 110a except that the carriers signals coupled to the modulators 116b and 120b are reversed. That is, the carrier frequency 112 is coupled to the modulator 120b in the SSB generator 110b, while the carrier frequency is coupled to the modulator 116a in the SSB generator 110a. The carrier signal from the 90° phase shift circuit 114 is coupled to the modulator 116b in the SSB generator 110b, while the carrier frequency from the 90° phase shift circuit is coupled to the modulator 120a in the SSB generator 110a. The reversal of the carriers in the SSB generator 110b and the inversion of the data signal 104 by the inverter 124 cause the SSB generator 110b to generate a sideband that is complementary to the sideband generated by the SSB generator 110a. The SSB generator 110a generates the upper sideband, while the SSB generator 110b generates the lower sideband.

The outputs from the two SSB generators 110a and 110b are summed by an adder 126 to generate a modulated data signal 128. The operation of the SSB generators 110a and 110b is well known by those skilled in the art. Those skilled in the art will recognize that there are a number of other techniques that can be used to generate single sidebands, such as double sideband modulation with a filter to remove the unwanted sideband, as well as other quadrature modulation methods.

Returning again to FIG. 4A, the output of the signal generator 108 is the modulated data signal 128, which contains an upper and lower sideband, as is normal with any modulated signal. However, the upper and lower sidebands are not merely mirror images of each other, but are phase inverted with respect to each other. This is due to the operation of the signal generator 108 on the data signal 104. The modulated data signal 128 is added to the video signal 106 by an adder 130 to produce a modified video signal 132, which contains the standard video signal 106 as well as the data signal 104 (in modulated form).

The modified video signal 132 is transmitted by a transmitter 134. The output of the transmitter 134 is a transmitted signal 136. There are many well known television transmitters that can be used satisfactorily with the system 100. The transmitter 134 may be a conventional television transmitter, a transmitter such as those used by conventional cable television companies, a signal generated by a video recorder or the like. Details of the transmitter 134 are not discussed herein. The actual type of transmitter 134 should not be considered a limitation of the system 100.

The transmission medium in which the transmitted signal 136 is transmitted depends on the transmitter 134. The transmitted signal 136 may be any type of electromagnetic signals such as radio frequency signals, electrical signals on a wire cable, optical signals on a fiber-optic cable, or the like.

A receiver portion 138 of the system 100 receives the transmitted signal 136 and processes it to recover the data signal 104 and the video signal 106. The data signal 104 and the video signal 106 are independently processed within the receiver portion 138.

A video receiver 140 processes the transmitted signal 136 to recover the video signal 106. The video receiver 140, which is a standard television or video component, demodulates the transmitted signal 136 in the manner previously described to recover the video signal 106. When the video receiver 140 demodulates the transmitted signal 136, the modulated data signal 128 component of the transmitted signal 136 is canceled out because of the complementary sidebands.. As previously discussed, the upper and lower sidebands of the modulated data signal 128 are mirror images and phase inverted with respect to each other. As previously discussed, demodulating the chrominance signal involves modulating the chrominance signal with another 3.58 MHz carrier. This generates a lower sideband containing the sum of the original upper and lower sideband. Because the upper and lower sidebands are added together when demodulated, the opposite phases of the upper and lower sidebands of the modulated data signal 128 cancel each other out when the video receiver 140 demodulates the transmitted signal 136. Ideally, the cancellation is completely effective because the upper and lower sidebands are perfect opposites of each other. In practice, the signal generator 108 cannot create a perfect phase shifted pair of signals. However, currently available circuits can create a sufficiently accurate signal generator 108 to effectively cancel the data signal 104 in the video receiver 140. Thus, the system 100 can be used with any video signal and will not interfere with the normal operation of a television, video recorder, or other video equipment. This effectively allows unused portions of the spectrum to be occupied by the data signal 104.

Figure 6:
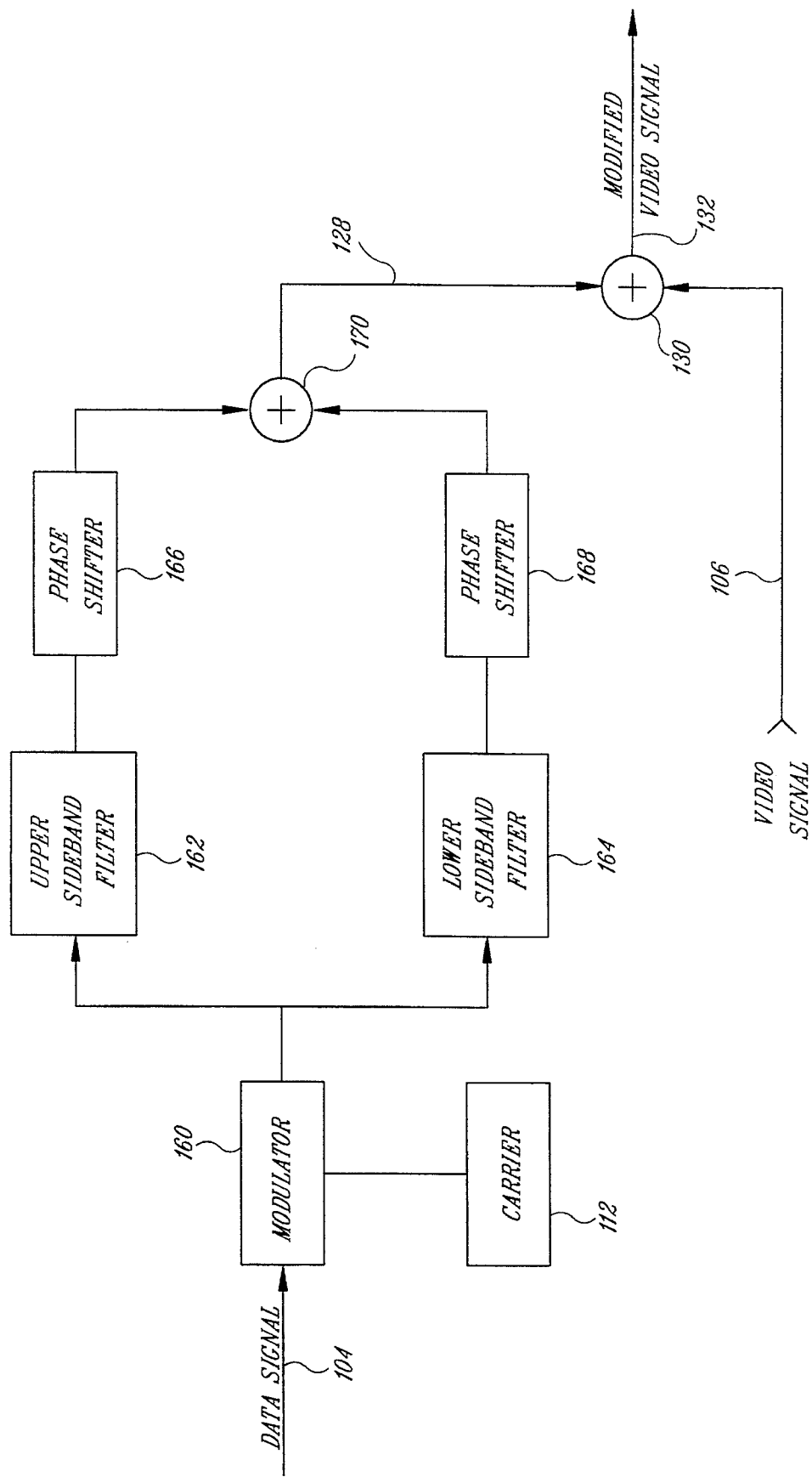
FIG. 6 illustrates an alternative embodiment of the present invention.

As an alternative to the embodiment of the signal generator 108 shown in FIG. 4B, it is possible for the transmitter portion 102 of the system 100 to modulate the data signal 104 using a standard modulator 160, shown in FIG. 6, to create the upper and lower sidebands. The operation of the standard modulator 160 is well known in the art, and will not be described herein. As seen in FIG. 6, the upper and lower sidebands may then be processed separately so that the bands have a 180° phase relationship. Bandpass filters 162 and 164 filter the modulated signal to separate the upper and lower sidebands, respectively. Phase shifters 166 and 168 phase shift the upper and lower sidebands, respectively, such that the sidebands have the requisite 180° phase relationship. Alternatively, the receiver portion 138 of the system 100 can use a single phase shifter to shift the upper or lower sideband such that the sidebands have the requisite 180° phase relationship. The phase shifted upper and lower sidebands are added together by an adder 170 to generate the modulated data signal 128 with the 180° phase relationship between the upper and lower sidebands. The modulated data signal 128 is added to the video signal 106 by the adder 130, as previously discussed. In this manner, the upper and lower sidebands of the modulated data signal 128 are canceled when the Video receiver 140 processes the transmitted signal 136. Other means of generating the 180° phase relationship between the upper and lower sidebands of the modulated data signal 128 may also be used.

Referring again to FIG. 4A, the data signal 104 is recovered by the receiver portion 138 of the system 100 by separating the modulated data signal 128 from the transmitted signal 136. A signal separator 142, which is a conventional television signal processing component, is used to separate the chrominance signal, including the modulated data signal 128, from the transmitted signal 136. In the presently preferred embodiment, the signal separator is a bandpass filter centered at the chrominance carrier frequency (3.579545 MHz). The chrominance signal, including the modulated data signal 128, is processed by a signal processor 144. The signal processor 144, which is sometimes referred to as a quadrature demodulator, is a well-known SSB component that causes another phase shift of the positive and negative frequencies to generate a recovered signal. The result is that the data contained in the upper and lower sidebands of the recovered signal has a phase relationship of 0° with respect to each other. At the same time, the chrominance signal, which previously had a phase relationship of 0° for the upper and lower sidebands, now has a 180° phase relationship for the upper and lower sidebands. Thus, the data signal 104 contained in the upper and lower sidebands will no longer cancel each other out when they are demodulated by the signal processor 144. At the same time, chrominance signal contained in the upper and lower sidebands will cancel out when demodulated by the signal processor 144 because there is a 180° phase relationship between the chrominance signal in the upper and lower sidebands.

Figure 7:
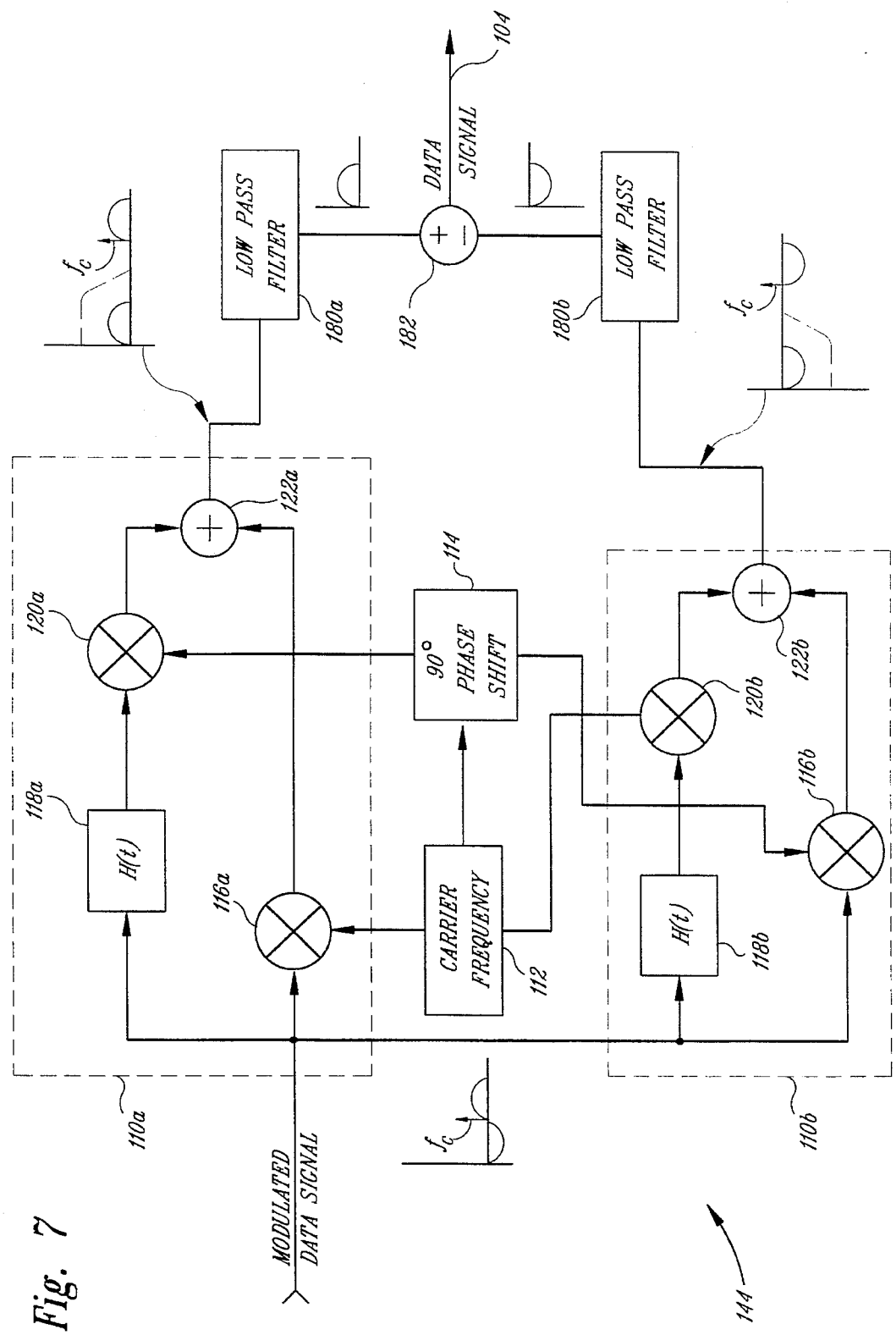
FIG. 7 illustrates one embodiment of the signal processor of FIG. 4A.

One embodiment of the signal processor 144 is illustrated in FIG. 7. The circuit of FIG. 7 is almost identical to the signal generator 108 shown in FIG. 4B. The SSB generators 110a and 110b in FIG. 4B and FIG. 7 are identical and are thus designated with the same reference numerals to simplify the discussion. The carrier frequency 112 and the 90° phase shift circuit 114 are also identical to the corresponding components in FIG. 4B.

There is no inverter 124 required in the signal processor 144 because the data signal 104 has already been processed in the transmitter portion 102 to generate the upper and lower sidebands with the 180° phase relationship. As is well known in the art, the output of each SSB receiver 110a and 110b contains a lower sideband positioned at 0 Hz and upper sideband positioned at twice the carrier frequency. The output from the SSB receivers 110a and 110b are each processed by lowpass filters 180a and 180b to remove the upper sideband. The lower sidebands pass through the lowpass filters 180a and 180b and are subtracted from each other by a subtractor 182, which is a conventional component used to subtract one signal from another. Thus, the data signal 104 is recovered from the transmitted signal 136. In this manner, the data signal 104 may be easily inserted into a portion of the spectrum and recovered in the receiver portion 138 of the system 100. The data signal 104 does not interfere with normal video operation because the data signal 104 is not detected by the video receiver 140.

Figure 1A:
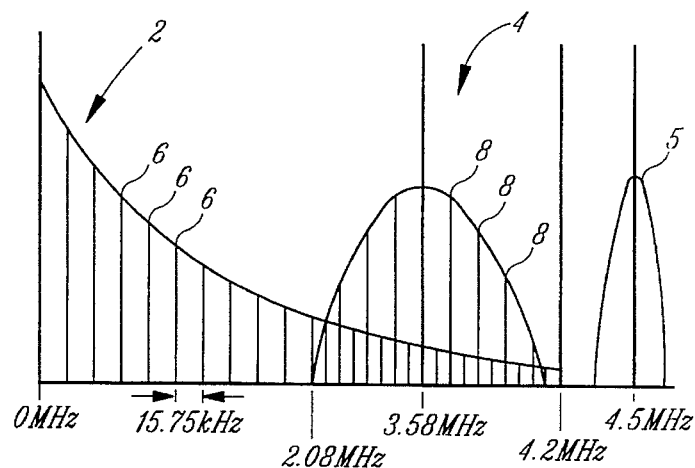
FIG. 1 illustrates the spectrum of a prior art NTSC standard signal.
Figure 8:
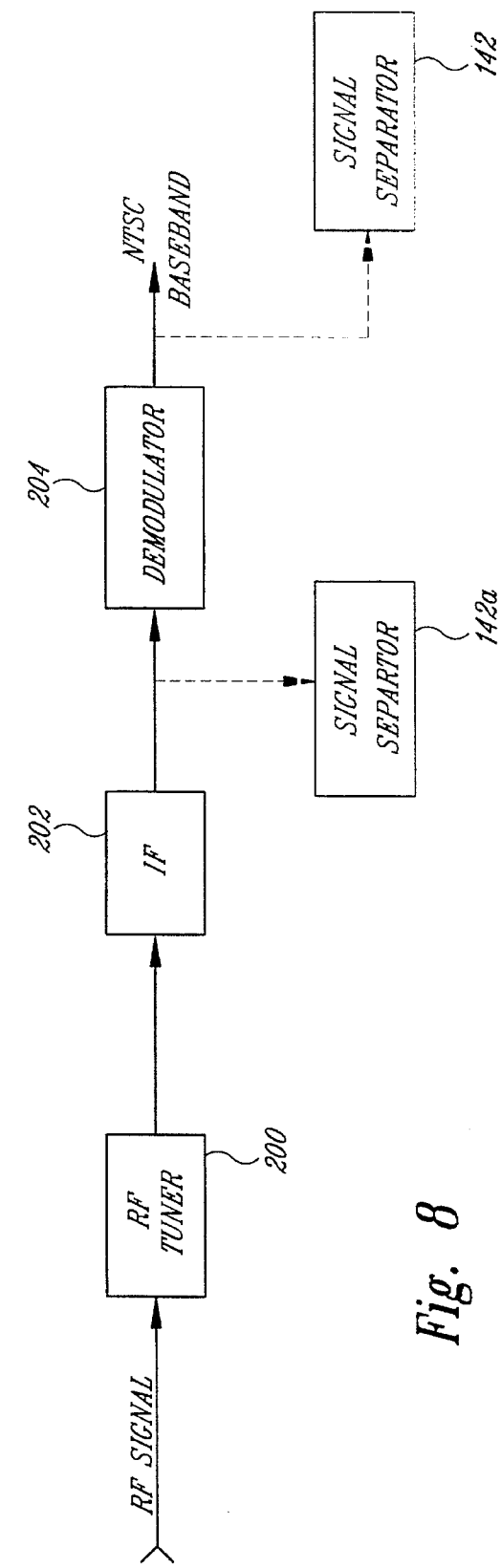
FIG. 8 illustrates an alternative embodiment of the present invention.

The data signal 104 may be inserted into the vestigial sideband of the chrominance carrier, as described above. In this location in the spectrum, the data signal may have a bandwidth of approximately 600 kHz. Alternatively, the data signal 104 may be inserted into the picture carrier at 1.25 MHz, as shown in FIG. 7. The vestigial sideband associated with the picture carrier is significantly larger than the chrominance vestigial sideband. The data signal 104 is inserted into the NTSC video signal at the source of television transmission (i.e., the television station or cable television source). When the data signal 104 is inserted into the chrominance portion of the spectrum of the NTSC video signal, the data signal can be recovered from the NTSC baseband video signal. However, if the data signal is inserted into the luminance portion of the spectrum of the NTSC video signal, the tuner is required to demodulate the data signal 104. A block diagram of a typical television tuner circuit is illustrated in FIG. 8 where a radio frequency (RF) tuner 200 receives the RF signal containing both the NTSC video signal and the data signal 104. An intermediate frequency (IF) stage, typically using a 44 MHz IF carrier frequency, generates an IF signal centered at the IF frequency. A demodulator 204 demodulates the IF signal to generate the NTSC baseband video signal illustrated in FIG. 1. If the data signal 104 was inserted into the chrominance portion of the NTSC video signal, as previously discussed, the signal separator 142 is a bandpass filter coupled to the output of the demodulator and centered at the chrominance carrier frequency. However, if the data signal 104 is inserted into the luminance carrier portion of the NTSC video signal, the signal separator 142a is a bandpass filter centered at the IF carrier frequency plus 1.25 MHz. The signal separators 142 and 142a generate identical output signals that are processed in the manner previously described.

The examples presented above relate to the NTSC video standard. As can readily be appreciated, the principles of the present invention are applicable to any video standard, such as the Phase Alternating Line (PAL) standard used in European countries.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for inserting a data signal into an existing video signal, comprising:

a signal generator operatively receiving the data signal and generating a modulated signal at a predetermined carrier frequency having upper and lower sidebands, said upper and lower sidebands of said modulated signal having a phase relationship such that said upper and lower sidebands of said modulated signal are substantially 180° apart with respect to each other;

an adder adding said modulated signal and the existing video signal to produce a modified video signal;

a transmitter transmitting said modified video signal;

a television receiver having a television video demodulator receiving said modified video signal and demodulating said modified video signal to recover the existing video signal and to substantially cancel said modulated signal;

a signal processor receiving said modified video signal and generating a recovered signal having upper and lower sidebands, each containing said modulated signal and the existing video signal, said recovered signal having a phase relationship of substantially 0° between said modulated signal in said upper sideband of said recover signal and said modulated signal in said lower sideband of said recovered signal, said recovered signal also containing the existing video signal having a phase relationship of substantially 180° between the existing video signal of said upper sideband of said recovered signal and the existing video signal in said lower sideband of said recovered signal; and a demodulator demodulating said recovered signal to recover the data signal and to substantially cancel the existing video signal, whereby the data signal is inserted into the existing video signal, transmitted with the existing video signal, and after receipt separated from the existing video signal.

2. The system of claim 1 wherein said predetermined carrier frequency is 3.579545 MHz.

3. The system of claim 1 wherein said predetermined carrier frequency is 1.25 MHz.

4. The system of claim 1 wherein said signal generator includes a Hilbert transformer.

5. The system of claim 1 wherein said signal processor is a quadrature demodulator.

6. A system for inserting a data signal into an existing video signal for transmission to a conventional television receiver having a television video demodulator, the system comprising:

a modulator modulating a predetermined carrier frequency with the data signal to produce a modulated signal having upper and lower sidebands;

a signal processor processing at least one of said upper and lower sidebands of said modulated signal so that the phase of said upper and lower sidebands of said modulated signal are substantially 180° apart with respect to each other;

an adder element adding said upper and lower sidebands of said modulated signal with said substantially 180° phase relationship to the existing video signal to produce a modified video signal, said modulated signal being substantially removable from said modified video signal by the television video demodulator;

a conventional television receiver having a television video demodulator receiving said modified video signal and demodulating said modified video signal to recover the existing video signal and to substantially cancel said modulated signal;

an inverse signal processor receiving said modified video signal and processing at least one of said upper and lower sidebands with said substantially 180° phase relationship so that the phase of said upper and lower sidebands are phase shifted substantially 0° apart with respect to each other; and a demodulator demodulating said upper and lower sidebands with said substantially 0° phase relationship to recover the data signal and to cancel the existing video signal.

7. A system for inserting a data signal into an existing video signal for transmission to a conventional television receiver having a television video demodulator, the system comprising:

a signal generator operatively receiving the data signal and generating a modulated signal at a predetermined carrier frequency having upper and lower sidebands, said upper and lower sidebands of said modulated signal having a phase relationship such that said upper and lower sidebands of said modulated signal are substantially 180° apart with respect to each other; and an adder adding said modulated signal and the video signal to produce a modified video signal containing the data signal and the existing video signal, said modulated signal being substantially removable from said modified video signal by the television video demodulator.

8. The system of claim 7 wherein said signal generator includes a Hilbert transformer.

9. The system of claim 7 wherein said predetermined carrier frequency is 3.579545 MHz.

10. The system of claim 7 wherein said predetermined carrier frequency is 1.25 MHz.

11. A system for inserting a data signal into an existing video signal for transmission to a conventional television receiver having a television video demodulator, the system comprising:

a modulator modulating a predetermined carrier frequency with the data signal to generate a modulated signal having upper and lower sidebands;

a signal processor processing at least one of said upper and lower sidebands of said modulated signal so that the phase of said upper and lower sidebands of said modulated signal are phase shifted substantially 180° apart with respect to each other; and an adder adding said upper and lower sidebands of said modulated signal with said substantially 180° phase relationship to the existing video signal to generate a modified video signal containing the data signal and the existing video signal, said modulated signal being substantially removable from said modified video signal by the television video demodulator.

12. The system of claim 11 wherein said signal processor includes a Hilbert transformer.

13. The system of claim 11 wherein said predetermined carrier frequency is 3.579545 MHz.

14. The system of claim 11 wherein said predetermined carrier frequency is 1.25 MHz.

15. A system for recovering a data signal inserted into an existing video signal and transmitted with the existing video signal, the data signal being processed into a modulated signal having upper and lower sidebands, the upper and lower sidebands of the modulated signal having a phase relationship such that the upper and lower sidebands of the modulated signal are substantially 180° apart with respect to each other, the modulated signal being added to the existing video signal to produce a modified video signal, said modulated signal being substantially removable from the modified video signal by a conventional television received, the system comprising:

an inverse signal processor receiving the modified video signal and producing a recovered signal having upper and lower sidebands, each containing said modulated signal and the existing video signal, said recovered signal having a phase relationship of substantially 0° between said modulated signal in the upper sideband of said recovered signal and said modulated signal in the lower sideband of said recovered signal, said recovered signal also containing the existing video signal having a phase relationship of substantially 180° between the existing video signal of said upper sideband of said recovered signal and the existing video signal in said lower sideband of said recovered signal; and a subtractor circuit receiving said upper and lower sidebands of said recovered signal and subtracting said upper and lower sidebands of said recovered signal from each other to recover the data signal, whereby the data signal inserted into the existing video signal and transmitted with the existing video signal is separated from the existing video signal upon receipt.

16. The system of claim 15 wherein said inverse signal processor includes an inverse Hilbert transformer.

17. The system of claim 15 wherein said inverse signal processor includes a quadrature demodulator.

18. A system for recovering a data signal inserted into a portion of an existing video signal and transmitted with the existing video signal, the data signal being modulated with a predetermined carrier frequency to produce a modulated signal having upper and lower sidebands, at least one of the upper and lower sidebands of the modulated signal being processed so that the phase of the upper and lower sidebands of the modulated signal are substantially 180° apart with respect to each other, the upper and lower sidebands with the substantially 180° phase relationship being added to the existing video signal to produce a modified video signal, said modulated signal being substantially removable from the modified video signal by a conventional television receiver, the system comprising:

an inverse signal processor receiving the upper and lower sidebands with the substantially 180° phase relationship and processing at least one of the upper and lower sidebands with the substantially 180° phase relationship so that the phase of the upper and lower sidebands are shifted substantially 0° apart with respect to each other; and a demodulator demodulating the upper and lower sidebands with the substantially 0° phase relationship to recover the data signal and to cancel the existing video signal.

19. The system of claim 18 wherein said inverse signal processor is a quadrature demodulator.

20. A method for inserting a data signal into an existing video signal for transmission to a conventional television receiver having a television video demodulator, the method comprising the steps of:

modulating the data signal with a predetermined carrier frequency to generate a modulated signal having upper and lower sidebands, said upper and lower sidebands of said modulated signal having a phase relationship such that said upper and lower sidebands of said modulated signal are substantially 180° apart with respect to each other;

adding said modulated signal and the existing video signal to produce a modified video signal, said modulated signal being substantially removable from said modified video signal by the television video demodulator;

transmitting said modified video signal;

demodulating said modified signal with the television video demodulator to recover the existing video signal and substantially cancel said modulated signal;

inverse transforming said modified video signal to produce a recovered signal having upper and lower sidebands, each containing said modulated signal and the existing video signal, said recovered signal having a phase relationship of substantially 0° between said modulated signal in said upper sideband of said recovered signal and said modulated signal in said lower sideband of said recovered signal, said recovered signal also containing the existing video signal having a phase relationship of substantially 180° between the existing video signal of said upper sideband of said recovered signal and the existing video signal in said lower sideband of said recovered signal; and demodulating said recovered signal to recover the data signal, whereby the data signal is inserted into the existing video signal, transmitted with the existing video signal, and after receipt separated from the existing video signal.

21. The method of claim 20 wherein said step of transforming the data signal phase delays the data signal by substantially 90°.

22. The method of claim 20 wherein said predetermined carrier frequency is 3.579545 MHz.

23. The method of claim 20 wherein said predetermined carrier frequency is 1.25 MHz.

24. The method of claim 20 wherein said steps of inverse transforming and demodulating said modified video signal quadrature demodulates said modified video signal.

25. A method for inserting a data signal into an existing video signal for transmission to a conventional television receiver having a television video demodulator, the method comprising the steps of:

modulating a predetermined carrier frequency with the data signal to produce a modulated signal having upper and lower sidebands;

processing at least one of said upper and lower sidebands of said modulated signal so that the phase of said upper and lower sidebands of said modulated signal are phase shifted substantially 180° apart with respect to each other;

adding said upper and lower sidebands with said substantially 180° phase relationship to the existing video signal to produce a modified video signal, said modulated signal being substantially removable from said modified video signal by the television video demodulator;

processing at least one of said upper and lower sidebands with said substantially 180° phase relationship in an inverse signal processor so that the phase of said upper and lower sidebands are phase shifted substantially 0° apart with respect to each other; and demodulating said upper and lower sidebands with said substantially 0° phase relationship to recover the data signal and to cancel the existing video signal.

26. A method for inserting a data signal into an existing video signal for transmission to a conventional television receiver having a television video demodulator, the method comprising the steps of:

modulating the data signal with a predetermined carrier frequency to generate a modulated signal having upper and lower sidebands, said upper and lower sidebands of said modulated signal having a phase relationship such that said upper and lower sidebands of said modulated signal are substantially 180° apart with respect to each other; and adding said modulated signal and the existing video signal to produce a modified video signal containing the data signal and the existing video signal, said modulated signal being substantially removable from said modified video signal by the television video demodulator.

27. The method of claim 26 wherein said step of transforming the data signal phase delays the data signal by substantially 90°.

28. The method of claim 26 wherein said predetermined carrier frequency is 3.579545 MHz.

29. The method of claim 26 wherein said predetermined carrier frequency is 1.25 MHz.

30. A method for inserting a data signal into an existing video signal for transmission to a conventional television receiver having a television video demodulator, the method comprising the steps of:

modulating a predetermined carrier frequency with the data signal to generate a modulated signal having upper and lower sidebands;

processing at least one of said upper and lower sidebands of said modulated signal so that the phase of said upper and lower sidebands are phase shifted substantially 180° apart with respect to each other; and adding said upper and lower sidebands with said substantially 180° phase relationship to the existing video signal to generate a modified video signal containing the data signal and the existing video signal, said modulated signal being substantially removable from said modified video signal by the television video demodulator.

31. A method for recovering a data signal inserted into a portion of an existing video signal and transmitted with the existing video signal, the data signal being processed and modulated with a carrier frequency into a modulated signal having upper and lower sidebands, the upper and lower sidebands of the modulated signal having a phase relationship such that said upper and lower sidebands of the modulated signal are substantially 180° apart with respect to each other, the modulated signal being added to the existing video signal to produce a modified video signal, said modulated signal being substantially removable from the modified video signal by a conventional television, the method comprising the steps of:

inverse transforming the modified video signal to produce a recovered signal having upper and lower sidebands, each containing the modulated signal and the existing video signal, said recovered signal having a phase relationship of substantially 0° between the modulated signal in the upper sideband of said recovered signal and the modulated signal in the lower sideband of said recovered signal, said recovered signal also containing the existing video signal having a phase relationship of substantially 180° between the existing video signal of the upper sideband of said recovered signal and the existing video signal in the lower sideband of said recovered signal; and demodulating said recovered signal to recover the data signal, whereby the data signal inserted into the existing video signal and transmitted with the existing video signal is separated from the existing video signal upon receipt.

32. The method of claim 31 wherein said steps of inverse transforming and demodulating the modified video signal quadrature demodulates the modified video signal.

33. A method for recovering a data signal inserted into a portion of an existing video signal and transmitted with the existing video signal, the data signal being modulated with a predetermined carrier frequency to produce a modulated signal having upper and lower sidebands, at least one of the upper and lower sidebands of the modulated signal being processed so that the phase of the upper and lower sidebands are shifted substantially 180° apart with respect to each other, the upper and lower sidebands with the substantially 180° phase relationship being added to the existing video signal to produce a modified video signal, the modulated signal being substantially removable from the modified video signal by a conventional television, the method comprising the steps of:

processing at least one of the upper and lower sidebands with the substantially 180° phase relationship so that the phase of the upper and lower sidebands are shifted substantially 0° apart with respect to each other; and demodulating the upper and lower sidebands with the substantially 0° phase relationship to recover the data signal and to cancel the existing video signal.

* * * * *

UNITED STATES PATENT AND TRADEMARK OFFICE
CERTIFICATE OF CORRECTION

PATENT NO. : 5,621,471
DATED : April 15, 1997
INVENTOR(S) : William E. Kim et al.

It is certified that error appears in the above-indentified patent and that said Letters Patent is hereby corrected as shown below:

In column 10, claim 7, line 12, following "the", please insert --existing--.

In column 11, claim 15, line 11, following "television", please delete "received", and insert --receiver--.

Signed and Sealed this

Ninth Day of September, 1997

Attest:

BRUCE LEHMAN

*Attesting Officer*      *Commissioner of Patents and Trademarks*